US000001247H

United States Statutory Invention Registration [19]

[11] Reg. Number: H1247

Nash et al.

[43] Published: Nov. 2, 1993

[54] CONDUCTIVE DEVELOPER COMPOSITIONS AND PROCESSES THEREOF

[76] Inventors: Robert J. Nash, 1200 Severn Ridge, Webster, N.Y. 14580; James E. McNamara, R.D. 2 Harvest Dr., Sodus, N.Y. 14551

[21] Appl. No.: 315,968

[22] Filed: Feb. 27, 1989

[51] Int. Cl.[5] ..... G03G 9/10

[52] U.S. Cl. ..... 430/108; 430/137

[58] Field of Search ..... 430/110, 137, 111, 108

[56] References Cited

U.S. PATENT DOCUMENTS

| | | | |
|---|---|---|---|
| 3,655,374 | 4/1972 | Palermiti et al. | 96/1.4 |
| 3,983,045 | 9/1976 | Jugle et al. | 252/62.1 P |
| 4,014,098 | 9/1986 | Miyakawa et al. | 439/106.6 |
| 4,252,881 | 2/1981 | Lipani | 430/108 |
| 4,282,302 | 8/1981 | Makino et al. | 430/107 |
| 4,374,191 | 2/1983 | Mukoh et al. | 430/111 X |
| 4,407,923 | 10/1983 | Miyakawa et al. | 430/106.6 |
| 4,513,074 | 4/1985 | Nash et al. | 430/106.6 |
| 4,560,635 | 12/1985 | Hoffend et al. | 430/106.6 |
| 4,592,988 | 6/1986 | Aldrich et al. | 430/107 |
| 4,598,034 | 7/1986 | Honjo et al. | 430/106.6 |
| 4,614,698 | 9/1986 | Miyakawa et al. | 430/106.6 |
| 4,698,289 | 10/1987 | Aldrich et al. | 430/106.6 |
| 4,925,702 | 5/1990 | Ostertag et al. | 430/137 X |

FOREIGN PATENT DOCUMENTS

| | | | |
|---|---|---|---|
| 0050337 | 5/1981 | Japan | 430/137 |

*Primary Examiner*—Robert L. Stoll
*Assistant Examiner*—Joseph D. Anthony

[57] ABSTRACT

A developer composition with a conductivity of from about $10^{-6}$ to about $10^{-12}$ (ohm-cm)$^{-1}$ over a toner concentration of from about 1 to about 6 weight percent, which developer is comprised of a toner containing resin particles, pigment particles and a metal salt of a fatty acid; and carrier particles with rough surfaces thereon.

41 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONDUCTIVE DEVELOPER COMPOSITIONS AND PROCESSES THEREOF

BACKGROUND OF THE INVENTION

This invention is generally directed to conductive developer compositions, and processes for the preparation of toner and developer compositions. More specifically, the present Invention is directed to developers with certain conductivities. In one embodiment of the present invention, the developer comprises rough surfaced carrier components, or cores. There is also provided in accordance with the present Invention processes for the preparation of conductive developers containing toner compositions comprised of resin particles, pigment particles, and optional surface additives such as colloidal silicas, metal salts, metal salts of fatty acids, or mixtures thereof. The present invention is also directed to conductive developer compositions comprised of the aforementioned toners and ferrite carrier particles, reference for example U.S. Pat. Nos. 4,598,034 and 4,614,698, the disclosures of which are totally incorporated herein by reference, with rough surfaces thereon. The toner and developer compositions of the present invention are useful in electrophotographic imaging and printing systems, especially those systems wherein blade cleaning of the photoconductive member is accomplished. Further, the developer compositions of the present invention possess stable conductivities, that is for example the developer conductivity changes by a factor of three or less over a toner concentration range as large as 6 weight percent with nominal 100 micron average diameter carriers. For example, in one embodiment of the present invention the conductivity of the developer composition is from about $10^{-6}$ to about $10^{-12}$, and more specifically $6\times10^{10}$ to about $3\times10^{-10}$ (ohm-cm)$^{-1}$ for a corresponding toner concentration range of from 1 weight percent to about 6 weight percent.

Conductive xerographic developers containing either a positive or a negative toner polarity are useful in electrophotography, especially in xerographic imaging processes since, for example, such developers provide a higher degree of toner development than insulative developers. This increased degree of development allows the construction of compact machine designs, and/or provides for increased rates of copy generation. Conductive developers are especially useful in applications where large areas of extensive development are required, that is for example wherein large solid areas of text or pictorial renditions, either in black or color, are to be formulated. Also, conductive developers are usually characterized by the avoidance of the development of unwanted background particles (for example, the absence of toner particles in the white, non-image areas of copies), thus enabling images that typically evidence dark images on a pure white background. Conduction in a conductive xerographic developer refers to electrical conduction from carrier to carrier particle, and a developer will remain conductive when a carrier to carrier pathway is maintained. With use, conductive carrier particles may become coated with insulating material such as firmly-adhering toner particles or fragments, thereby resulting in the loss of conductive properties. Similarly, free, or triboelectrically held toner particles may disrupt carrier to carrier contacts, and thus reduce a conductive developer to an insulative failed state. The probability of this latter type of failure occuring will increase as the toner concentration of the developer increases, thus a developer which is conductive at a reasonable range of toner concentration will show an insulative failure if the toner concentration is allowed to increase to high values, that is where the surface of the carrier beads are substantially covered with toner particles. Further, conductive developers can also fail by becoming excessively conductive when, for example, they conduct a current of about 0.1 mA (milliamp) or more, and this type of failure is often associated with conductive developers based on metallic carriers. For the aforementioned carriers, the intrinsic conductivity of the metal is too high for many xerographic applications. These metallic carriers, therefore, are normally provided with a surface oxidation treatment, and/or a partial surface coating with an insulating polymer to reduce the metal conductivity to a lower useful level. Unfortunately, with use in xerographic machines, such protective carrier coatings or oxide layers are removed resulting in an eventual excessive conductivity failure state. Thus, there is a continued need for conductive developer designs with a conductivity not affected by carrier surface wear or contamination, and not affected by variations in toner concentrations over a certain range. These and other needs are accomplished with the present invention.

Stable conductive developer compositions are disclosed in U.S. Pat. No. 4,513,074, the disclosure of which is totally incorporated herein by reference. In this patent, there is disclosed stable conductive developers containing resin particles, pigment particles, colloidal silica additive particles, fatty acid metal salt additive particles, and uncoated ferrite carrier particles, reference for example the Abstract of the Disclosure. Conductive and other characteristics of the developer of this patent are illustrated, for example, in column 5, beginning at line 40. In column 4, lines 53 to 54, it is indicated that the carrier for the developer has a conductivity of from about $10^{-9}$to about $10^{-12}$(ohm-cm)$^{-1}$.

There is disclosed in U.S. Pat. No. 4,598,034 low density disintegrated ferrite carriers, however, there is no teaching in this patent relating to processes for obtaining stable developer conductivity over a wide range of toner concentration, although carrier conductivity is disclosed. More specifically, this patent is primary concerned with useful compositions of Cu-Zn− ferrites, see for example columns 2 and 3, and the working examples. Also, there is disclosed in U.S. Pat. No. 4,614,698 two component developers with magnetic carriers with certain parameters including an electrical resistance of from $6\times10^4$ to $2.5\times10^6$ ohms. In column 4 of this patent, it is indicated that ordinary ferrite carriers have a certain higher dynamic resistance. Also, in column 6, beginning at line 41, of the '698 patent it is indicated that the sintered ferrite particles have an uneven surface, or a fine uneven surface as a carrier component, see column 6, lines 47 to 48, for example. Further, in this patent there is also disclosed the effect of toner concentration on developer conductivity, and an optimum value of toner concentration is specified, see for example column 11, lines 20 through 68, and column 12, lines 1 through 9. Also, there is no teaching in this patent relating to maintaining the carrier conductivity over a wide range of toner concentrations by, for example, including a metal salt of a fatty acid in the toner, and selecting a rough surfaced carrier particle. Patents of background interest include U.S. Pat. Nos. 4,282,302; 4,407,923; 4,592,988 and 4,698,289.

Also, many patents disclose the use of metal salts of fatty acids, such as zinc stearate for toner compositions, such as U.S. Patent No. 3,655,374, the disclosure of which is totally incorporated herein by reference. Also, it is known that the aforementioned toner compositions with metal salts of fatty acids can be selected for electrostatic imaging methods wherein blade cleaning of the photoreceptor is accomplished, reference U.S. Pat. No. 3,635,704, the disclosure of which is totally incorporated herein by reference. Additionally, there are illustrated in U.S. Pat. No. 983,045, the disclosure of which is totally incorporated herein by reference, three component developer compositions comprising toner particles, a friction reducing material, and a finely divided nonsmearable abrasive material, reference column 4, beginning at line 31. Examples of friction reducing materials include saturated or unsaturated, substituted or unsubstituted, fatty acids preferably of from 8 to 35 carbon atoms, or metal salts of such fatty acids; fatty alcohols corresponding to said acids; mono and polyhydric alcohol esters of said acids and corresponding amides; polyethylene glycols and methoxy-polyethylene glycols; terephthalic acids; and the like, reference column 7, lines 13 to 43.

SUMMARY OF THE INVENTION

It is an object of the present invention to produce conductive developer compositions.

Another object of the present invention is the provision of stable conductive developer compositions, and processes for the preparation thereof, which developers remain conductive over a wide range of toner concentrations.

Additionally, in another object of the present invention there are provided processes for the preparation of stable conductive developer compositions that contain carriers, especially ferrite carriers with rough surfaces, which carriers are preferably prepared by the crushing of fired ferrites.

Moreover, in another object of the present invention there are provided stable conductive developer compositions that contain toners preferably with external additives, which additives are usually of the film-forming type such as metal salts of fatty acids, and wherein the carriers selected are comprised of rough surfaces.

Also, in another object of the present invention there are provided conductive developers which provide a high rate of xerographic development, for example, they provide large increases in the amount of developed toner for small increases in the xerographic electrostatic image potential, which is desirable for black or colored imaging systems requiring the reproduction of large solid image areas, or for imaging systems wherein the available electrostatic Image potential is not large, for example about 300 volts or less. Furthermore, there is provided in accordance with the present invention conductive stable developers that can be selected for electrophotographic systems with a small, compact developer housing, or where it is desirable to completely develop the electrostatic image. An example of the latter application would be the development of positive and negative images by tandem developer housings of opposite polarities.

Moreover, another object of the present invention relates to the provision of toner and developer compositions that permit improved blade cleaning of photoconductive surfaces.

These and other objects of the present invention are accomplished by providing conductive developer compositions and processes for the preparation thereof. More specifically, the present invention is directed to stable conductive developer compositions prepared by admixing carriers with rough surfaces thereon, especially ferrites as illustrated, for example, in the aforesaid '034 patent, the disclosure of which is totally incorporated herein by reference, and toner compositions comprised of resin particles, pigment particles, optional charge enhancing additive components, film-forming surface additives such as metal salts of fatty acids, and optional surface additives such as colloidal silicas. Examples of silica additives are as indicated herein, reference the U.S. patents mentioned, which additives are commercially available, such as as Aerosil R972, and the like. Generally, the silica particles are present in the developer composition, and more specifically as an additive, preferably as an external toner additive, in a weight percent of from about 0.1 percent by weight to about 1 percent by weight based on the weight of the toner. The film-forming additive, such as a metal salt of a fatty acid, including zinc stearate, is present preferably as an external additive in an amount of from about 0.1 percent by weight to about 1 percent by weight based on the weight of the toner particles. In one preferred embodiment of the present invention the developer composition is comprised of ferrite carrier of the type disclosed in the '034 patent mixed with a toner blended with 0.7 percent of Aerosil R972 and 0.7 percent of zinc stearate as external additives, and wherein the core possesses rough surfaces.

In accordance with one embodiment of the present invention, there are provided conductive developer compositions with a conductivity of from about $10^{-6}$ to about $10^{-12}$, and more specifically $10^{-9}$ to about $10^{11}$ $(\text{ohm-cm})^{-1}$ and comprised of toner compositions containing resin particles, such as styrene butadiene resins, pigment particles such as carbon blacks, color pigments such as cyan, magneta, yellow, red, blue, brown, and the like; metal salts of fatty acids; colloidal silica particles; optional charge enhancing additives, particularly for example distearyl dimethyl ammonium methyl sulfate, reference U.S. Pat. No. 4,560,635, the disclosure of which is totally incorporated herein by reference; cetyl pyridinium chloride, reference U.S. Pat. No. 4,298,672, the disclosure of which is totally incorporated herein by reference; and carrier particles with rough surfaces. As preferred carrier components for the aforementioned compositions, there are selected steel or ferrite materials with rough surfaces thereon as illustrated herein, either without a coating or with a polymeric coating thereover including the coatings as illustrated in U.S. Ser. No. 751,922, entitled Developer Composition with Specific Carrier Particles, the disclosure of which is totally incorporated herein by reference. One particularly preferred coating illustrated in the aforementioned copending application is comprised of a copolymer of vinyl chloride and trifluorochloroethylene with conductive substances dispersed in the polymeric coating inclusive of, for example, carbon black. One embodiment disclosed in the aforementioned copending application is a developer composition comprised of styrene butadiene copolymer resin particles, and charge enhancing additives selected from the group consisting of alkyl pyridinium halides, ammonium sulfates, and organic sulfate or sulfonate compositions; and carrier particles comprised of a core with a partial coating of vinyl copolymers, or vinyl homopolymers. Other coatings that may be selected for the carriers of the present invention include methyl terpolymers, reference U.S. Pat. Nos. 3,467,634 and 3,526,533, the disclosures of which are totally incorporated herein by reference; fluoropolymers such as Kynar, mixtures thereof, and the like, reference for example U.S. Pat. No. 3,590,000, the disclosure of which is totally incorporated herein by reference. Coating weights are dependent on a number of factors such as the composition of the core; generally, however, the coating weight can be from about 0.1 to about 5 weight percent.

In a preferred embodiment, the present invention is directed to a developer composition with a conductivity of from about $10^{-6}$ to about $10^{-12}$ (ohm-cm)$^{-1}$ and preferably from about $10^{-10}$ for a toner concentration range of from about 1 to 6 weight percent, which developer is comprised of a toner containing resin particles, pigment particles and a metal salt of a fatty acid as an external additive; and carrier particles with rough surfaces thereon. Also, developers with specific conductivities of from about$3\times10^{-10}$ to about$6\times10^{-6}$ (ohm-cm)$^{-1}$ for a toner concentration range of from about 1 to about 6 weight percent can be selected.

Illustrative examples of suitable toner resins selected for the toner and developer compositions of the present invention and present in various effective amounts such as, for example, from about 65 percent by weight to about 95 percent by weight, include polyesters, polyamides, epoxy resins, polyurethanes, polyolefins, vinyl resins, polymeric esterification products of a dicarboxylic acid and a diol comprising a diphenol, toner resins grafted or blended within, for example, an amount of from about 3 to about 10 percent by weight low molecular weight waxes such as alkylenes, including polypropylene or polyethylene. Additionally, a second crosslinked resin may be included in the toner, an example being a terpolymer of crosslinked styrene butylacrylate acrylonitrile. Various suitable vinyl resins may be selected as the toner resin including homopolymers or copolymers of two or more vinyl monomers. Typical vinyl monomeric units include styrene, p-chlorostyrene, vinyl naphthalene, unsaturated mono-olefins such as ethylene, propylene, butylene, isobutylene and the like; vinyl halides such as vinyl chloride, vinyl bromide, vinyl fluoride, vinyl acetate, vinyl propionate, vinyl benzoate, and vinyl butyrate; vinyl esters such as esters of monocarboxylic acids including methyl acrylate, ethyl acrylate, n-butylacrylate, isobutyl acrylate, dodecyl acrylate, n-octyl acrylate, 2-chloroethyl acrylate, phenyl acrylate, methylalpha-chloroacrylate, methyl methacrylate, ethyl methacrylate, and butyl methacrylate; acrylonitrile, methacrylonitrile, acrylamide; vinyl ethers such as vinyl methyl ether, vinyl isobutyl ether, and vinyl ethyl ether; N-vinyl indole; N-vinyl pyrrolidone; styrene butadiene copolymers, especially styrene butadiene copolymers prepared by a suspension polymerization process, reference U.S. Pat. No. 4,558,108, the disclosure of which is totally incorporated herein by reference; and mixtures thereof.

As one preferred toner resin, there can be selected the esterification products of a dicarboxylic acid and a diol comprising a diphenol, which components are illustrated in U.S. Pat. No. 3,590,000, the disclosure of which is totally incorporated herein by reference. Other preferred toner resins included styrene/methacrylate copolymers, styrene/acrylate copolymers, and styrene/butadiene copolymers, especially those as illustrated in the aforementioned '108 patent; and styrene butadiene resins with high styrene content, that is exceeding from about 80 to 85 percent by weight of styrene, which resins are available as Pliolites® from Goodyear Chemical Company; polyester resins obtained from the reaction of bisphenol A and propylene oxide, followed by the reaction of the resulting product with fumaric acid; and branched polyester resins resulting from the reaction of dimethylterephthalate, 1,3,-butanediol, 1,2-propanediol and pentaerythritol. Also, toner compositions comprised of first resin particles with a wax, such as 660P available from Sanyo, and second resin particles, such as terpolymers, can be selected for the present invention.

Numerous well known suitable pigments can be selected as the colorant for the toner particles including, for example, carbon black, nigrosine dye, aniline blue, phthalocyanine derivatives, and mixtures thereof. The pigment, which is preferably carbon black, should be present in a sufficient amount to render the toner composition colored thereby permitting the formation of a clearly visible image. Generally, the pigment particles are present in amounts of from about 3 percent by weight to about 20 percent by weight, based on the total weight of the toner composition, however, lesser or greater amounts of pigment particles can be selected providing the objectives of the present invention are achieved. Also, magnetites in amounts of, for example, from about 10 to about 75 weight percent may also be selected as pigments in some embodiments of the present invention, as well as mixtures of carbon blacks, or similar pigments and magnetites.

Also encompassed within the scope of the present invention are colored conductive developer compositions containing toner compositions with pigments or colorants such as red, blue, brown, magenta, cyan, and/or yellow particles, as well as mixtures thereof. More specifically, with regard to the generation of color images utilizing the toner and developer compositions of the present invention, illustrative examples of magenta materials that may be selected include, for example, 2,9-dimethyl-substituted quinacridone and anthraquinone dye identified in the Color Index as Cl 60710, Cl Dispersed Red 15, a diazo dye identified in the Color Index as Cl 26050, Cl Solvent Red 10, Lithol Scarlett, Hostaperm, and the like. Illustrative examples of cyan materials that may be used as pigments include copper tetra-4(octadecyl sulfonamido) phthalocyanine, X-copper phthalocyanine pigment listed in the Color index as Cl 74160, Cl Pigment Blue, and Anthrathrene Blue, identified in the Color Index as Cl 69810, Special Blue X-2137, Sudan Blue, and the like; while illustrative examples of yellow pigments that may be selected include diarylide yellow 3,3-dichlorobenzidene acetoacetanilides, a monazo pigment identified in the Color Index as Cl 12700, Cl Solvent Yellow 16, a nitrophenyl amine sulfonamide identified in the Color index as Foron Yellow SE/GLN, Cl Dispersed Yellow 33, 2,5-dimethoxy-4-sulfonanilide phenylazo-4'-chloro-2,5-dimethoxy aceto-acetanilide, Permanent Yellow FGL, and the like. These pigments are generally present in the toner composition in an amount of from about 2 weight percent to about 15 weight percent based on the weight of the toner resin particles.

Illustrative examples of optional charge enhancing additives present in various effective amounts, such as for example from about 0.1 to about 20 percent by weight, and preferably from about 1 to about 5 percent by weight include alkyl pyridinium halides, such as cetyl pyridinium chlorides, reference U.S. Pat. No. 4,298,672, the disclosure of which is totally incorporated herein by reference, cetyl pyridinium tetrafluoroborates, quaternary ammonium sulfate, and sulfonate charge control agents as illustrated in U.S. Pat. No. 4,338,390, the disclosure of which is totally incorporated herein by reference; stearyl phenethyl dimethyl ammonium tosylates, reference U.S. Pat. No. 4,338,390, the disclosure of which is totally incorporated herein by reference; distearyl dimethyl ammonium methyl sulfate, reference U.S. Pat. No. 4,560,635, the disclosure of which is totally incorporated herein by reference; stearyl dimethyl hydrogen ammonium tosylate; and other known similar charge enhancing additives providing the objectives of the present invention are accomplished; and the like. Negative charge additives, such as orthophenyl carboxylic acids, TRH available from Hodogaya Chemical, and the like, may also be selected. The triboelectric charge on the toner depends on a number of factors. Generally, however, it is from about 10 to about 40, and preferably about 15 to about 35 microcoulombs per gram.

As metal salts of fatty acids, there can be selected zinc stearate, calcium stearate, and the like, reference U.S. Pat. Nos. 3,655,374; 3,590,000; and 3,983,045, the disclosures of which are totally incorporated herein by reference. These metal salts are usually present as external additives in an amount of from about 0.1 to about 1 percent, however, other amounts may be useful providing the objectives of the present invention are achievable. Examples of colloidal silica, usually present as external additives in an amount of from about 0.1 to about 1 percent, however, other amounts may be useful providing the objectives of the present invention are achievable, include Aerosil R972, and the like, reference U.S. Pat. Nos. 3,590,000; 3,655,374; 3,720,617 and 3,900,588, the disclosures of which are totally incorporated herein by reference.

Illustrative examples of carrier particles with rough surfaces that can be selected for mixing with the toner compositions include those particles that are capable of triboelectrically obtaining a charge of opposite polarity to that of the toner particles as indicated herein. Accordingly, the carrier particles of the present invention can be selected so as to be of a negative polarity thereby enabling the toner particles which are positively charged to adhere to and surround the carrier particles. Alternatively, there can be selected carrier particles with a positive polarity enabling toner compositions with a negative polarity. Illustrative examples of carrier cores that may be selected are as indicated herein and include nickel, iron, ferrites, copper-zinc ferrites, and the like. Also, carriers selected for the present invention can be comprised of a magnetic, such as steel, core with a polymeric coating thereover, several of which are illustrated, for example, in U.S. Ser. No. 751,922 relating to developer compositions with certain carrier particles, the disclosure of which is totally incorporated herein by reference. More specifically, there are illustrated in the aforementioned copending application carrier particles comprised of a core with a coating thereover of vinyl polymers, or vinyl homopolymers. Examples of specific carriers illustrated in the copending application, and particularly useful for the present invention providing they include rough conductive surfaces thereon are those comprised of a steel or ferrite core with a coating thereover of a vinyl chloride/trifluorochloroethylene copolymer, which coating contains therein conductive particles, such as carbon black. Other coatings include fluoropolymers, such as polyvinylidenefluoride resins, poly(chlorotrifluoroethylene), fluorinated ethylene and propylene copolymers, terpolymers of styrene, methylmethacrylate, and a silane, such as triethoxy silane, reference U.S. Pat. Nos. 3,467,634 and 3,526,533, the disclosures of which are totally incorporated herein by reference; polytetrafluoroethylene, fluorine containing polyacrylates, and polymethacrylates; copolymers of vinyl chloride; and trichlorofluoroethylene; and other known coatings. There can also be selected as carriers components comprised of a core with a double polymer partial coating thereover, reference U.S. Ser. No. 793,042, entitled Developer Composition With Coated Carrier Particles, the disclosure of which is totally incorporated herein by reference, which carriers are processed in a manner to enable rough conductive surfaces thereon. More specifically, there is detailed in this application a process for the preparation of carrier particles with substantially stable conductivity parameters which comprises (1) mixing carrier cores with a polymer mixture comprising from about 10 to about 90 percent by weight of a first polymer, and from about 90 to about 10 percent by weight of a second polymer; (2) dry mixing the carrier core particles and the polymer mixture for a sufficient period of time enabling the polymer mixture to adhere to the carrier core particles; (3) heating the mixture of carrier core particles and polymer mixture to a temperature of between about 200° F. and about 550° F. whereby the polymer mixture melts and fuses to the carrier core particles; and (4) thereafter cooling the resulting coated carrier particles.

The carrier particles selected for the process of the present invention must include rough conductive surfaces thereon. These carriers are available, however, they can be prepared by the crushing or disintegrating of previously fired material cores including ferrites. Additionally, the conductivity of the crushed ferrite material may be increased by, for example, a factor of about 5,000 by a post-crushing reduction process, for example, with hydrogen gas at from 300° to 500°.

Also, while the diameter of the carrier particles can vary, generally they are of a diameter of from about 30 microns to about 1,000 microns, thus allowing these particles to possess sufficient density and inertia to avoid adherence to the electrostatic images during the development process. The carrier particles can be mixed with the toner particles in various suitable combinations, however, best results are obtained when about 1 to about 5 parts per toner to about 10 parts to about 200 parts by weight of carrier are mixed.

In addition, the toner and developer compositions of the present invention may be selected for use in developing images in electrostatographic imaging systems, containing therein, for example, conventional photoreceptors, such as selenium and selenium alloys, including selenium arsenic, selenium tellurium, and the like; as well as halogen doped selenium components, and halogen doped selenium alloys, wherein the halogen is usually present in various effective amounts, such as for example 200 to 500 parts per million. Also useful, especially wherein there is selected positively charged toner compositions, are layered photoresponsive devices comprised of transport layers and photogenerating layers, reference U.S. Pat. Nos. 4,265,990; 4,585,884; 4,584,253 and 4,563,408, the disclosures of which are totally incorporated herein by reference, and other similar layered photoresponsive devices. Examples of photogenerating layers include selenium, selenium alloys, trigonal selenium, metal phthalocyanines, metal free phthalocyanines and vanadyl phthalocyanines, while examples of charge transport layers include the aryl amines as disclosed in U.S. Pat. No. 4,265,990. Moreover, there can be selected as photoconductors hydrogenated amorphous silicon; and as photogenerating pigments squaraines, perylenes; and the like.

One specific preferred developer composition of the present invention is comprised of a toner composition with (1) a styrene n-butylmethacrylate copolymer resin containing therein, or grafted with a low molecular weight, 1,000 to about 10,000, of alkylene wax, such as a polypropylene wax, or polyethylene wax, (2) a second terpolymer resin comprised of a crosslinked styrene butylacrylate acrylonitrile composition, (3) pigment particles comprised of carbon black, (4) externally applied colloidal silica particles, (5) externally applied zinc stearate particles, and uncoated crushed conductive rough surfaced ferrite carrier particles.

The following examples, except for the comparative examples, are being submitted to further define various species of the present invention. These examples are intended to illustrate and not limit the scope of the present invention. Also, parts and percentages are by weight unless otherwise indicated. One important attribute of the developers of the present invention presented in some of the Examples is developer conductivity and their stability with respect to a certain toner concentration. The procedure used for the measurement of conductivity and conductivity/toner concentration sensitivity was as follows. Carrier or developer conductivity (or the inverse function of resisitivity) can be measured by various suitable known methods including, for example, in a packet, static bed with flat measuring electrodes as described in U.S. Pat. No. 4,598,034, the disclosure of which is totally incorporated herein by reference; in a rotating magnetic brush system with curved measuring electrodes as shown in U.S. Pat. No. 4,614,698, the disclosure of which is totally incorporated herein by reference; in a static magnetic brush system with a flat measurement electrode surrounded by a grounded guard plate as described in U.S. Pat. No. 4,513,074, the disclosure of which is totally incorporated herein by reference. In the following examples, the measuring system as illustrated in the '074 patent was employed. More specifically, the conductivity measurements were effected over a range of toner concentrations as indicated to enable the sensitivity of the developer conductivity value to the value of the toner concentration to be determined. The conductivity of a conductive developer is a function of the number of toner particles contained on the surface of the conductive carrier particles, and increasing amounts of toner particles will produce a reduction in the overall conductivity of the developer. Experimentally, it is usually found that the logarithm of the developer conductivity is a linearly decreasing function of the toner concentration of the developer. If a ratio R is defined as the ratio of the carrier conductivity to the developer conductivity at some specified toner concentration, then division of the natural logarithm of R by the value of the toner concentration will yield a conductivity sensitivity parameter which can be used as a criterion of the conductivity response to toner concentration.

EXAMPLE I

There was prepared by melt blending followed by mechanical attrition and classification a toner comprised of 67.5 weight percent of first resin particles of a styrene/n-butylmethacrylate copolymer, 80 percent by weight of styrene, 20 percent by weight of an n-butylmethacrylate resin, and 7 percent by weight of a low molecular weight polypropylene wax, (available as 660P), which first resin particles are available from Sanyo Kasai Chemical Company, and 22.5 percent by weight of second resin particles of a styrene, butyl acrylate, acrylonitrile terpolymer, crosslinked with divinylbenzene, which second resin particles are available from Nippon Zeon, and 10 percent by weight of carbon black, Black Pearls 1300, available from Cabot Corporation. The resulting toner was mixed by tumbling in a glass jar with smooth, round, uncoated stainless steel carrier beads (about 100 microns in diameter, available from the Nuclear Metals Division of the Whittaker Corporation) to produce a test developer at a toner concentration of 1 weight percent, that is 1 part of toner per 100 parts of carrier. While the uncoated steel carrier conductivity was at a highly conductive value of $1.8\times10^{-7}$ (ohm-cm)$^{-1}$, the developer conductivity dropped to $8.6\times10^{-12}$ (ohm-cm)$^{-1}$ at the 1 percent by weight toner concentration, thus providing a conductivity sensitivity value of 9.9. This latter value is very large, and indicates that the developer would cease to be conductive at certain toner concentration. For example, at a toner concentration of 2 weight percent the developer conductivity would be $10^{-16}$ (ohm-cm)$^{-1}$, a totally insulative value. This Example illustrates that smooth metallic carriers will produce poorly conductive toned developers, even though the carriers themselves are very conductive. Thus, in a xerographic imaging machine requiring a conductive developer, the developer in this Example will usually provide development of only the edges of large solid area images.

EXAMPLE 11

The toner of Example I was mixed with relatively smooth uncoated Ni-Zn ferrite carrier beads (100 microns in diameter) in a glass jar at toner concentrations of zero, 1.1, 2.1 and 3.0 weight percent, and the conductivity of the resulting developers was measured as indicated herein. The respective conductivity values were $5.0\times10^{-11}$, $8.4\times10^{-12}$, $3.0\times10^{-13}$ and $8.5\times10^{-15}$ (ohm-cm)$^{-1}$, and the conductivity sensitivity parameter was found to be 2.9. Thus, Example 11 illustrates the reduction in the sensitivity parameter when the carrier bead material is changed from smooth steel to the less dense relatively smooth ferrite. From the conductivity sensitivity parameter value for the relatively smooth ferrite carrier, it can be predicted, and it is believed that this developer will become totally insulating at a toner concentration of about 4.5 weight percent rather than at the 2 weight percent value for the smooth round steel carrier.

EXAMPLE III

The toner of Example I was mixed with a partially coated, 1.35 weight percent coating of polymethylmethacrylate applied by evaporation from a methyl ethyl ketone solution, rough, air-oxidized atomized steel carrier (rough surface carrier core selected obtained from Quebec Metals). The conductivity of the resulting carrier was a measured $7.2\times10^{-10}$(ohm-cm)$^{-1}$, and for toned developers based on this carrier at toner concentrations of 1.0, 2.2 and 3.3 the measured developer conductivities were $1.0\times10^{-10}$, $4.7\times10^{-12}$ and $8.5\times10^{-15}$ (ohm-cm)$^{-1}$, respectively. For toner concentrations in the range 1 to 2 weight percent, these data provide a conductivity sensitivity parameter of 2.3. Thus, Example III illustrates that carrier surface roughness can reduce the sensitivity of developer conductivity to toner concentration, for example, the developer in Example III has a lower conductivity sensitivity parameter than the developer in Example I, even though the surface of the carrier is partially coated with polymer in Example III and is bare metal in Example 1. However, the experimental data for developers in Example III at toner concentrations above 2 weight percent show that the developer conductivity becomes increasingly sensitive to toner concentration above 2 weight percent reaching a low value of $8.5\times10^{-15}$ (ohm-cm)$^{-1}$ at a toner concentration of 3.3 weight percent.

EXAMPLE IV

The carrier of Example I was mixed with the toner of Example I except that in Example IV the toner was first blended with 0.7 weight percent of Aerosil R972 (available from Degussa Inc.) and 0.7 weight percent of powdered zinc stearate (available from Diamond Shamrock), these latter powders being applied as external additives to the toner. Developer conductivity measurements with the aforesaid modified toner were accomplished at toner concentrations of 0 weight percent, 1.1 weight percent, 2.1 weight percent, and 3.1 weight percent, and the conductivity values were $1.8\times10^{-7}$, $1.6\times10^{-8}$, $1.6\times10^{-9}$ and $3.9\times10^{-10}$ (ohm-cm)$^{-1}$, respectively. This data, over a concentration range of from zero to 3 weight percent, indicate a conductivity sensitivity parameter of 2.0 in place of the 9.9 obtained with the toner of Example I. Thus, Example IV demonstrates the strong effect that external toner additives have on developer conductivity. The external additives used in Example IV also facilitate blade cleaning in the xerographic process, and thus such additives serve a dual purpose in this developer.

EXAMPLE V

The carrier of Example III was mixed with the surface additive toner of Example IV, and developer conductivity measurements were made at toner concentrations of 0 wt % (weight percent), 1.0 wt %, 2.1 wt %, 3.2 wt % and 4.3 wt %, and the corresponding conductivity values were $7.2\times10^{-10}9.3\times10^{-11}$, $28\times10^{-11}$, $5.5\times10^{-12}$ and $1.1\times10^{-12}$ (ohm-cm)$^{-1}$. From these data, the conductivity sensitivity parameter value was found to be 1.5, an appreciable reduction from the 2.3 value noted with the additive-free toner detailed in Example III. Thus, Example v shows that external toner additives such as zinc stearate can further improve the conductivity sensitivity parameter of even rough metal carriers.

EXAMPLE VI

A rough-surfaced ferrite prepared by disintegration of fired Cu-Zn ferrite (Product Number Fl-100, available from the Nippon Iron Powder Company, Ltd.) was mixed with the toner of Example I, and developer conductivity measurements were accomplished on the resulting developer at toner concentrations of 0 wt %, 1.2 wt %, 2.1 wt %, 3.0 wt %, 3.8 wt %, 4.7 wt % and 5.7 wt %. The corresponding developer conductivity values were found to be $5.3\times10^{-10}$, $2.5\times10^{-10}$, $1.5\times10^{-10}$, $9.8\times10^{-10}6.7\times10^{-11}$ $6.0\times10^{-11}$ and $4.8\times10^{-11}$ (ohm-cm)$^{-1}$, respectively. From this data, the conductivity sensitivity parameter was found to be 0.4. This example illustrates that a conductive developer with a low response of conductivity to toner concentration can be prepared by the use of a rough, low density ferrite carrier in place of a higher density steel carrier.

EXAMPLE VII

The relatively smooth ferrite carrier of Example II was mixed with the surface additive toner of Example IV, and the conductivity of the resulting developer was measured at toner concentrations of 0 wt %, 1.1 wt %, 2.1 wt %, 3.2 wt %, 4.0 wt %, 4.7 wt % and 5.9 wt %. The resulting corresponding developer conductivities were found to be $4.3\times10^{-11}$, $1.5\times10^{-11}$, $1.1\times10^{-11}$, $9.0\times10^{-12}$, $8.0\times10^{-12}$, $6.7\times10^{-12}$ and $6.0\times10^{-12}$ (ohm-cm)$^{-1}$. For this developer combination, the conductivity sensitivity parameter was found to be 0.2, almost a fifteen times reduction in sensitivity over that given with the same carrier coupled with the nonadditive toner used in Example II. In practical terms, the net effect is that the conductivity of the developer in Example VII will decrease only by a factor of about 2 for an increase in toner concentration of 4 wt %, whereas for the same increase in toner concentration the conductivity of the developer in Example II will decrease by a factor of about 100,000. Thus, the above toner concentration range, the conductivity of the developer in Example VII, decreases slightly from the conductivity of the untoned carrier, while the conductivity of the developer in Example II steeply declines from an initial conductive value to a final totally insulative value. The external toner additives with the toner from Example IV are extremely effective in reducing the conductivity sensitivity of a developer based on a light, relatively smooth ferrite carrier.

From an imaging viewpoint in xerographic machines requiring a conductive developer, it is believed that the developer in Example VII will produce well-filled solid area images over a wide range of toner concentrations, while the developer In Example II will show a trend from solid development to edge-only development as its toner concentration is increased.

EXAMPLE VIII

The rough-surfaced disintegrated ferrite of Example VI was mixed with the surface additive toner of Example IV, and the developer conductivity of the resulting developer was measured at toner concentrations of 0 wt %, 1.0 wt %, 2.0 wt %, 3.0 wt %, 4.0 wt %, 5.0 wt % and 6.1 wt %. The corresponding conductivity values were found to be $5.6\times10^{-10}$, $6.8\times10^{-10}$, $5.7\times10^{-10}$, $4.6\times10^{-10}$, $4.1\times10^{-10}$, $3.8\times10^{-10}$ and $3.4\times10^{-10}$ (ohm-cm)$^{-1}$. From these data, the conductivity sensitivity parameter was found to be an ultra-low value of 0.1, that is the conductivity of the developer was virtually insensitive to toner concentration over the toner concentration range examined. For a toner concentration change of 6 wt %, the conductivity of the developer in Example VIII will change only by a factor of about two. Example VIII evidences the beneficial conductivity insensitivity effect produced by the combination of light carrier density, rough carrier surface texture, and toners with external toner additives of zinc stearate and colloidal silica. In terms of imaging performance, the developer in Example VIII will show a constant conductive mode of development, that is well-filled solid area images, and well-suppressed background, that is over a wide range of toner concentrations, from about 1 to about 6 weight percent.

Other modifications of the present invention may occur to those skilled in the art subsequent to a review of the present application. The aforementioned modifications, including equivalents thereof, are intended to be included within the scope of the present invention.

What is claimed is:

1. A developer composition with a conductivity of from about $10^{-6}$ to about $10^{-12}$ (ohm-cm)$^{-1}$ over a toner concentration of from about 1 to about 6 weight percent, which developer is comprised of a toner containing resin particles, pigment particles and a metal salt of a fatty acid; and carrier particles with rough surfaces thereon.

2. A developer composition in accordance with claim 1 wherein the conductivity is from about $10^{-9}$to about $10^{-10}$ (ohm-cm)$^{-1}$.

3. A developer composition in accordance with claim 1 wherein the conductivity is from about $6\times10^{-10}$ to about $3\times10^{-10}$ (ohm-cm)$^{-1}$.

4. A developer composition in accordance with claim 1 wherein the carrier particles are comprised of a ferrite.

5. A developer composition in accordance with claim 4 wherein the carrier particles are comprised of a copper zinc ferrite.

6. A developer composition in accordance with claim 1 wherein the carrier particles are comprised of steel.

7. A developer composition in accordance with claim 1 wherein the metal salt is present in an amount of from about 0.1 to about 1 percent by weight.

8. A developer composition in accordance with claim 1 wherein the metal salt is zinc stearate.

9. A developer composition in accordance with claim 1 wherein the salt is present as an external additive.

10. A developer composition in accordance with claim 1 containing colloidal silica additive particles.

11. A developer composition in accordance with claim 10 wherein the particles are present in an amount of from about 0.1 to about 1 percent by weight.

12. A developer composition in accordance with claim 1 containing a charge enhancing additive.

13. A developer composition in accordance with claim 12 wherein the charge enhancing additive is selected from the group consisting of alkyl pyridinium halides, and distearyl dimethyl ammomium methyl sulfate.

14. A developer composition in accordance with claim 12 wherein the charge enhancing additive is present in an amount of from about 0. 1 to about 5 weight percent.

15. A developer composition in accordance with claim 1 wherein the resin particles are selected from the group consisting of styrene acrylates, styrene methacrylates, polyesters, and styrene butadienes.

16. A developer composition in accordance with claim 1 wherein the pigment particles are selected from the group consisting of carbon black, cyan, magenta, yellow, red, blue, green, brown, and mixtures thereof.

17. A developer composition in accordance with claim 1 wherein the carrier particles contain a polymeric coating.

18. A developer composition with a conductivity of from about $10^{-10}$ to about $10^{-12}$ (ohm-cm)$^{-1}$ over a toner concentration of from about 1 to about 6 weight percent, which developer is comprised of a toner composition, and a metal salt of a fatty acid; and a carrier with rough surfaces thereon.

19. A developer composition in accordance with claim 18 wherein the salt is present as an external additive.

20. A developer composition in accordance with claim 18 wherein the carrier is a ferrite or steel.

21. A developer composition in accordance with claim 18 wherein the carrier contains thereover a polymeric coating.

22. A developer composition in accordance with claim 21 wherein the polymeric coating is comprised of a fluoropolymer, polymethylmethacrylate, or a terpolymer of styrene, methylmethacrylate, and an organosilane.

23. A developer composition in accordance with claim 21 wherein the polymeric coating contains conductive particles therein.

24. A developer composition in accordance with claim 18 wherein the toner is comprised of resin and pigment.

25. A developer composition in accordance with claim 24 wherein the resin is a styrene acrylate, a styrene methacrylate, a styrene butadiene, a polyester, or mixtures thereof.

26. A developer composition in accordance with claim 24 wherein the pigment is carbon black, magnetite, cyan, magneta, yellow, red, blue, green, or brown.

27. A developer composition in accordance with claim 18 wherein the toner contains charge enhancing additives.

28. A process for the preparation of stable developer compositions with a conductivity of from about $10^{-10}$ to about $10^{-12}$ (ohm-cm)$^{-1}$ over a toner concentration of from about 1 to about 6 weight percent, which comprises admixing a toner composition comprised of resin particles, pigment particles, optional charge enhancing additives, containing on the surface thereof colloidal silicas, metal salts, metal salts of fatty acids, or mixtures thereof, with carrier particles with rough surfaces thereon.

29. A process for the preparation of stable developer compositions with a conductivity of from about $10^{-10}$ to about $10^{-12}$ (ohm-cm)$^{-1}$ over a toner concentration of from about 1 to about 6 weight percent, which comprises admixing a toner composition comprised of resin particles, pigment particles, optional charge enhancing additives, and on the surface thereof colloidal silicas, metal salts, metal salts of fatty acids, or mixtures thereof, with ferrite carrier particles containing rough surfaces thereon.

30. A process in accordance with claim 28 wherein the conductivity sensitivity is about 0.1.

31. A process in accordance with claim 28 wherein the rough carrier surfaces are obtained by the disintegration of fired carrier particles.

32. A process in accordance with claim 28 wherein there is added to the carrier a polymeric coating.

33. A process in accordance with claim 28 wherein the resin particles for the toner are selected from the group consisting of polyesters, styrene butadiene copolymers, styrene acrylate copolymers, and styrene methacrylate copolymers.

34. A process in accordance with claim 28 wherein the resin for the toner is a polyester results from the condensation reaction of dimethylterephthalate, 1,2-propanediol, 1,3-butanediol, and pentaerythritol; or wherein the polyester results from the condensation reaction of dimethylterephthalate, 1,2-propanediol, diethylene glycol, and pentaerythritol.

35. A developer in accordance with claim 18 wherein there is selected as the toner a styrene methylacrylate copolymer grafted with or containing a low molecular wax of polypropylene or polyethylene, and a second resin comprised of a styrene acrylate acrylonitrile terpolymer.

36. A developer in accordance with claim 18 wherein the toner is comprised of first resin particles, and second resin particles.

37. A developer in accordance with claim 1 wherein the carrier particles contain a partial or conductive coating thereover.

38. A developer composition with a conductivity of from about $10^{-6}$ to about $10^{-12}$ (ohm-cm)$^{-1}$, which developer is comprised of a toner containing resin particles, pigment particles and a metal salt of a fatty acid; and carrier particles with rough surfaces thereon.

39. A developer composition with a conductivity of from about $10^{-10}$ to about $10^{-12}$ (ohm-cm)$^{-1}$, which developer is comprised of a toner composition, and a metal salt of a fatty acid; and a carrier with rough surfaces thereon.

40. A process in accordance with claim 28 wherein the carrier particles with rough surfaces thereon are prepared by crushing or disintegrating carrier core materials.

41. A process in accordance with claim 28 wherein the rough surface carrier cores are prepared by crushing cores in the presence of hydrogen gas at a temperature of from about 300° to about 500° C.

* * * * *